(12) United States Patent
Wisniewski

(10) Patent No.: US 6,742,956 B2
(45) Date of Patent: Jun. 1, 2004

(54) FASTENER CLIP FOR SECURING TO A FIRST SHEET OF MATERIAL ANY SECOND PIECE, SUCH AS AN ADDITIONAL SHEET OF MATERIAL AND SUCH AS WITHIN A VEHICLE INTERIOR

(76) Inventor: David M. Wisniewski, 15762 Claire Ct., Macomb Township, MI (US) 48042

( * ) Notice: Subject to any disclaimer, the term of this patent is extended or adjusted under 35 U.S.C. 154(b) by 0 days.

(21) Appl. No.: 10/267,521

(22) Filed: Oct. 9, 2002

(65) Prior Publication Data

US 2004/0071505 A1 Apr. 15, 2004

(51) Int. Cl.$^7$ ................................. H01R 9/09
(52) U.S. Cl. ................ 403/297; 403/292; 403/294
(58) Field of Search ................ 403/297, 292, 403/219, 326, 329, 294, 286

(56) References Cited

U.S. PATENT DOCUMENTS

| | | | |
|---|---|---|---|
| 3,027,609 A | * | 4/1962 | Parkin et al. ............ 403/297 |
| 3,642,310 A | * | 2/1972 | Hudson ................... 403/219 |
| 4,430,033 A | | 2/1984 | McKewan |
| 4,435,031 A | * | 3/1984 | Black et al. ............ 403/292 X |
| 4,724,651 A | | 2/1988 | Fligg |
| 4,729,706 A | | 3/1988 | Peterson et al. |
| 6,029,418 A | | 2/2000 | Wright |
| 6,406,236 B1 | | 6/2002 | Olson, Jr. |

* cited by examiner

Primary Examiner—John R. Cottingham
(74) Attorney, Agent, or Firm—Gifford, Krass, Groh, Sprinkle, Anderson & Citkowski, P.C.

(57) ABSTRACT

A fastener clip for securing together a first material and a second material, at least the first material including a three dimensional and planar sheet exhibiting a bored interior defined by a least one inwardly facing side wall. The clip includes a flattened strap portion from which extends a first end configuration for fixedly engaging within the bored interior and against the inwardly facing side wall. The first end configuration further has a plurality of outwardly and radially extending arms, a gripping tab extending from each of the arms and including a pair of reverse angled teeth portions. A second and oppositely extending end configuration engages the second material and includes a pair of individual rail clip portion adapted to biasingly engage against oppositely facing sides of the second material.

6 Claims, 2 Drawing Sheets

FASTENER CLIP FOR SECURING TO A FIRST SHEET OF MATERIAL ANY SECOND PIECE, SUCH AS AN ADDITIONAL SHEET OF MATERIAL AND SUCH AS WITHIN A VEHICLE INTERIOR

BACKGROUND OF THE INVENTION

1. Field of the Invention

The present invention relates generally to fastener clip designs for various applications. More particularly, the present invention discloses a fastener clip exhibiting a first end configuration, this being particularly suited for engaging annular disposed side walls of a bored interior of a three dimensional sheet of a composite fiberglass/plasticized material. A second integrally formed and opposite extending end configuration is configured for fixedly engaging any suitable second piece of material to the first three dimensional sheet of material, and such as may further include a rail clip design for engaging a second running length of such material.

2. Description of the Prior Art

The prior art is well documented with examples of fastener clip designs for use in various applications, both vehicular and structural. A first example of this is set forth in U.S. Pat. No. 6,406,236, issued to Olson, Jr., and which discloses a panel fastener and method of manufacture. In particular, a fastener is provided for connecting a first panel to a second panel and comprises a head and a shaft, the shaft including a plurality of spring legs, each connected at one end to the head and flexing inward and outward relative to another end. The shaft is dimensioned for insertion into an aperture of the second panel with interference against aperture-defining edges.

Olson further teaches a plurality of grooves formed within each spring leg, each groove separated from an adjacent groove by a rib and which is configured having a ramped leading surface, a stepped trailing surface and a peak surface disposed between the leading and trailing surfaces. As illustrated, and upon the grooves of one spring leg being axially misaligned with the corresponding grooves of an adjacent spring leg such that each spring leg alternately locks its grooves into the aperture-defining edges of the second panel, the shaft is inserted into the aperture.

U.S. Pat. No. 6,029,418, issued to Wright, discloses a wire clip mounting system for mounting a structural panel to a wall. The clip is provided having a bail portion formed in an annular shape for insertion of a fastener element and fastening into an anchor member of the wall. An arm portion extends from the bail portion and includes a linear shape for insertion into the inner core of the panel at an exposed lateral edge. The bail portion is further offset from the arm portion both in a lateral direction and in a thickness direction of the panel so as to position the bail portion toward the wall anchor member when the arm portion is inserted into the inner core of the panel.

Finally, U.S. Pat. No. 4,729,706, issued to Peterson et al., discloses a fastener clip adapted to be pushed onto an edge of sheet materials of varying thicknesses. The clip has two legs, the first having a "U" shaped elongated tongue cut from it and bent towards the second leg to frictionally engage a sheet material disposed between the legs. The second leg further has an integral threaded barrel for receiving a bolt. The "U" shaped tongue is formed with offset bends to allow the tongue to yield when the clip is mounted on a thick sheet material.

SUMMARY OF THE INVENTION

The present invention discloses a fastener clip configured for engaging, to a first sheet of a three dimensional and planar configured material, a further sheet of material of any suitable configuration. The clip according to the present invention is particularly suited for engaging an annular recessed, or bored interior, defined within the first sheet of material, such material further being constructed, according to one application, of first and second sheets of a fiberglass matting which are separated by a core of a honeycombed plastic material.

The clip includes a first end configuration exhibiting a plurality of radially outwardly arms, these terminating in angularly (downwardly) configured gripping tabs which biasingly engage specified locations along the inner surface defining the bored interior. Preferably, the gripping tabs each further include reverse angled (upwardly and outwardly) teeth portions which, upon insertion of the first end configuration into the bored interior of the composite three dimensional sheet, engage against an underside of the upper most fiberglass sheet to prevent the withdrawal of the clip.

A second integrally formed and opposite extending end configuration is configured for fixedly engaging any suitable second piece of material to the first three dimensional sheet of material. In one preferred application, the second end configuration includes a pair of spaced apart and upwardly configured rail clip portions, these in turn further exhibiting arcuate ends for biasingly and springingly engaging against and over upper inserting ends of the second material piece, in this instance being an elongated beam or rail. It is again however understood that the rail clip portions defining the second end configuration can be modified to any other desired shape or configuration and such as may be suitable accommodating any other shape associated with the second piece.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
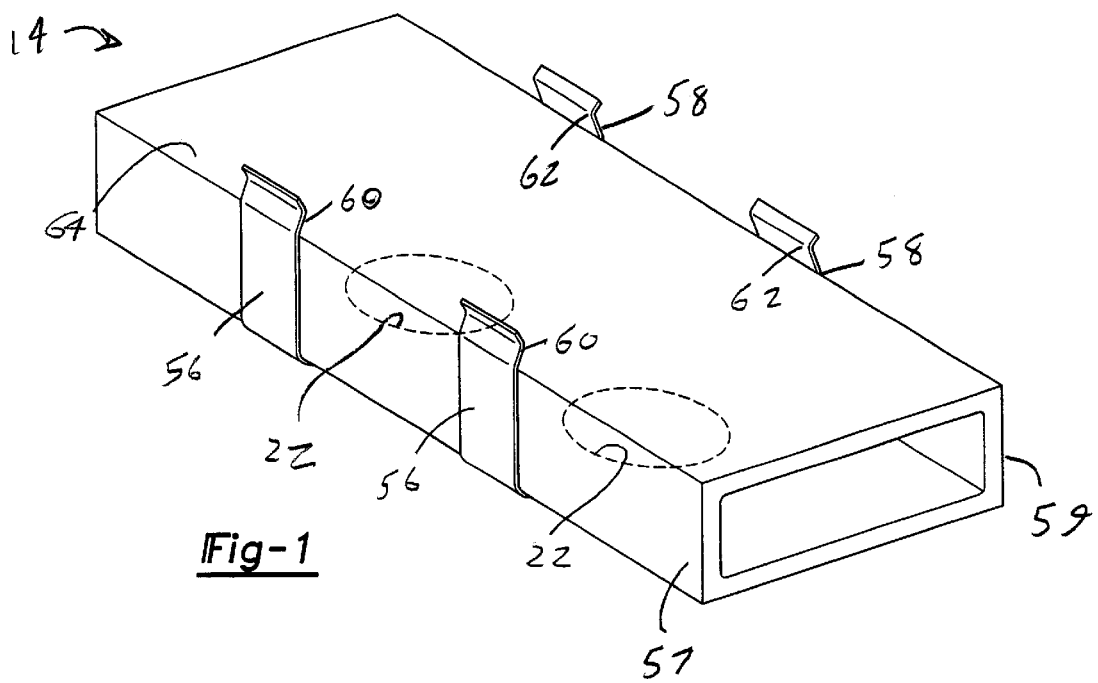
FIG. 1 is an environmental view, in perspective, illustrating a preferred application of the fastener clip design according to the present invention and which secures an elongated rail component upon a first three dimensional and planar sheet of material.
Figure 3:
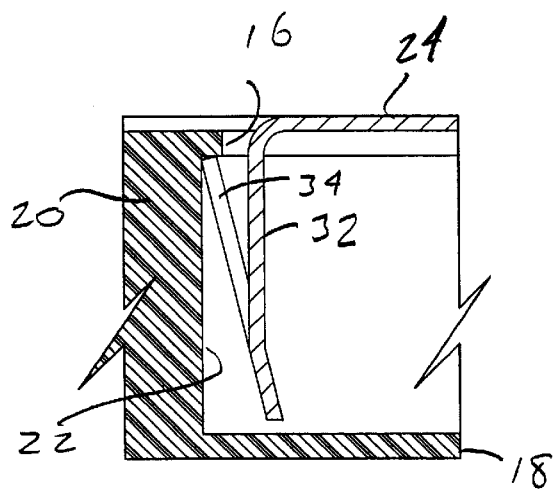
FIG. 3 is a cutaway view taken along line 3—3 of FIG. 2 and showing the manner in which the extending ends of the gripping tabs engage against the annular side wall according to the present invention.

Referring now to FIG. 3, a fastener clip is illustrated at 10 according to a preferred embodiment of the present invention and which is suitable for mechanically securing together a first sheet 12 of material with a second sheet or piece 14 of material (see further FIG. 1). The clip design of the present invention further provides superior mechanical fastening capabilities owing to its structural configuration as will be explained.

As was further previously explained, the first sheet of material 12 to be inter-engaged is provided, in the preferred application of the clip 10, as a three-dimensional and planar configured material having a pair of first 16 and second 18 layers of a fiberglass matted material separated by a core of a honeycombed plastic 20. As a result, the first sheet 12 of material exhibits the combined features of strength and light weight and is particularly well suited for such as passenger vehicle interior applications, including trunk cover plates and further such as floor boards, as well as similar maritime applications whereby the material 12 may be provided as a flooring for a boat owing again to its light weight and strength.

Figure 2:
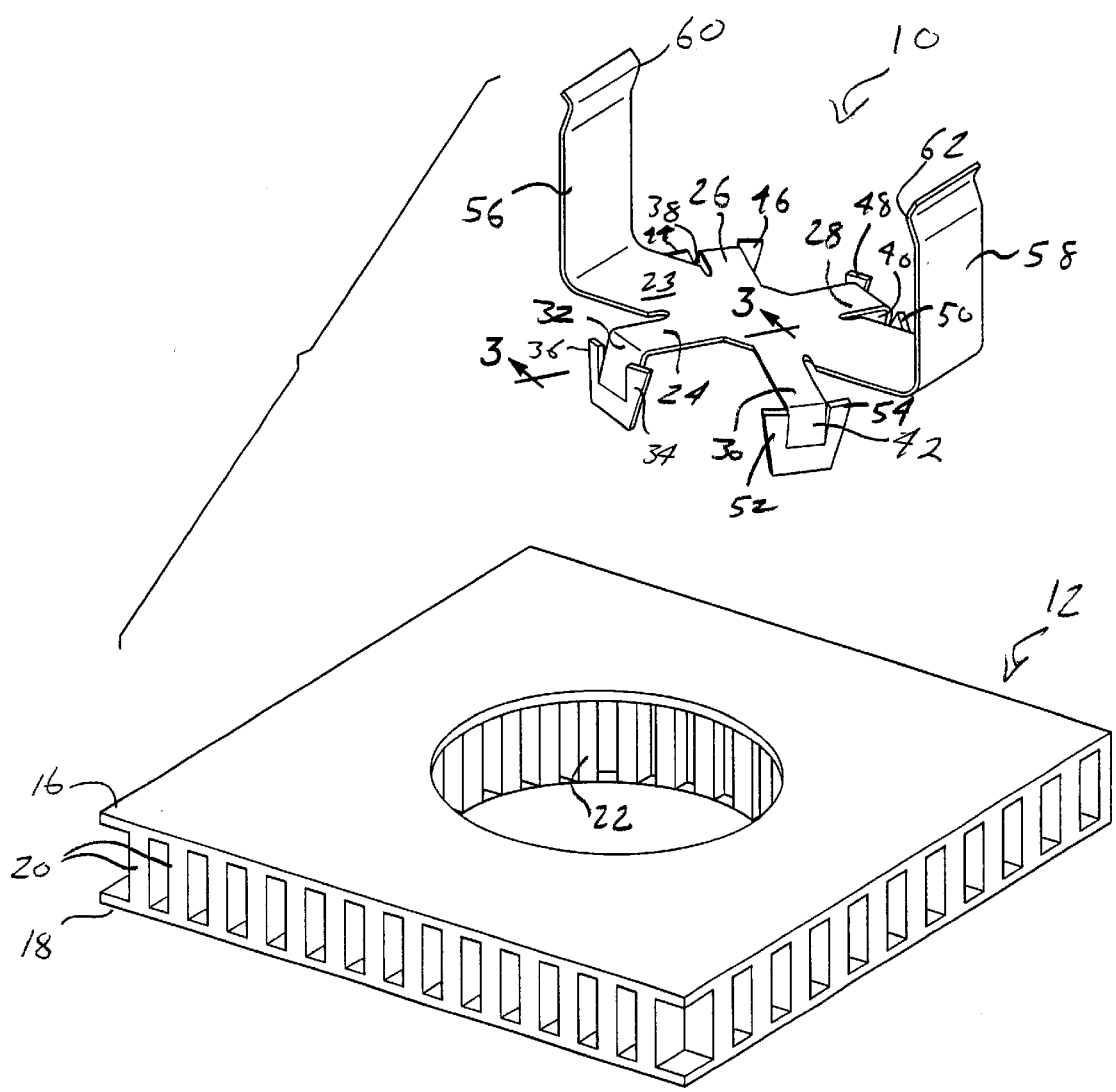
FIG. 2 is an exploded perspective view illustrating the fastener clip in arrayed fashion over the bored/recessed opening defined in the first three dimensional and planar sheet of composite material.

As is further best illustrated in FIG. 2, and prior to the installation of the clip 10, a recess or bored interior is defined within (and possibly through) the first sheet 12 of material. In a preferred step, a drilling or boring tool of sufficient diameter is employed to create a recessed interior or aperture, and which is again defined in FIG. 2 by an annular and inwardly facing side wall 22 defined within the interior core 20. As will be further explained in detail, the provision and configuration of the bored interior is essential for receiving engagement by the clip 10 and it is further understood that the bored interior could optionally be provided to a given depth of the sheet 12 (as illustrated) or, alternatively, completely through both of the spaced apart layers 16 and 18 in addition to the inter-disposed core 20.

Additional variations of the preferred application include the ability to define other and additional types of cross section bored interiors into the sheet 12, such possibly including any type of interiorly defined aperture such as a three sided polygon (triangular shaped), four sided polygon (square), five sided polygon (pentastar), six sided polygon (hexagon), ranging up to the circular variation illustrated, this namely being defined as a polygon exhibiting an infinite number of sides.

Referring again to FIG. 2, the clip 10 according to the present invention is particularly suited for engaging the annular recessed, or bored, interior 22 defined within the first sheet of material 12. The clip 10, in the preferred embodiment, is constructed of a suitable spring steel material and includes a main and flattened strap portion 23, from which extends a first end configuration exhibited by a plurality of radially outwardly extending arms 24, 26, 28 and 30. Although illustrated in substantially level extending fashion from the flattened strap portion 23, it is also envisioned that the arms 24, 26, 28 and 30 may incline or angle in any fashion, such as upwardly or downwardly, and such is contemplated within the present invention.

As further illustrated again in both FIGS. 2 and 3, each of the arms terminates in an angularly (downwardly) configured gripping tab. Referring specifically to the cutaway view of FIG. 3, selected radially extending arm 24 is illustrated, from which extends in substantially perpendicularly and downward fashion tab 32. Mounted to the tab 32 and extending in a substantially reverse angled and upward/outward fashion is a pair of teeth portions, see in particular at 34 and 36. Referring once again to FIG. 3, additional tabs 38, 40 and 42 are illustrated for radially extending arms 26, 28, and 30, respectively, each further including corresponding pairs of reverse angled teeth portions 44 & 46, 48 & 50,and 52 & 54.

Referring again to FIG. 3, a portion of the first engaging end of the clip 10, namely a selected one 24 of the radially extending arms with configured end gripping tab 32 and reverse angled teeth 34 and 36, is illustrated in biasingly engage specified locations along the inner annular surface 22 defining the bored interior. In the preferred application the teeth portions, upon insertion of the arms 24, 26, 28 and 30 and associated tabs 32, 38, 40 and 42, into the bored interior of the composite three dimensional sheet, engage against an underside of the upper most fiberglass layer 16 such that, given the reverse angled disposition of the pairs of teeth combined with both the relative sizing of the bored interior and the spring biasing material construction of the clip 10, prevents the withdrawal of the clip 10 from within the annular bore. It is also envisioned that the clip design of the first end configuration, referencing again the tabs and teeth, can be designed to accommodate significant torque applications, and by which the first end configuration can be installed twisting and pressing down in a combined manner and in addition or alternative to pressing directly down into the bored interior.

Referring again to FIG. 2, a second integrally formed and opposite extending end configuration of clip 10 is provided for fixedly engaging any suitable second piece of material to the first three dimensional sheet 12 of material. In the preferred application, and as illustrated in both FIGS. 1 and 2, the second end configuration of the clip 10 includes a pair of spaced apart and upwardly configured rail clip portions 56 and 58, these in turn further exhibiting arcuate shaped ends, see at 60 and 62 respectively for clip portions 56 and 58.

As best further illustrated in FIG. 1, a pair of individual rail clip portions 56 and 58 biasingly and springingly engaging against opposite facing sides of the second material (see at 57 and 59) and over an upper inserting end (see upper surface at 64) of the second material piece 14. In this instance, the piece 14 is provided as an elongated beam or rail fixed in engaging fashion upon the first sheet 12 (not illustrated further in this view but evidenced by the bored apertures 22 illustrated in phantom and corresponding to the inserting placement of the first inserting end configurations of first and second associated clips).

It is again however understood that the focus of the present invention is on the configuration of the first end configuration, and that the rail clip portions defining the second end configuration can be modified to any other desired shape or configuration, in integral extending fashion from the main body portion of the clip 10 and such as may be suitable accommodating any other shape associated with an inter-engageable second piece. It is also further understood that the second piece 14 (or second material) may also be constructed similarly to the first sheet 12 or may be provided as a wood or metal beam, stud or any other suitable material.

Having described my invention, additional preferred embodiments will become apparent to those skilled in the art to which it pertains and without deviating from the scope of the appended claims.

I claim:

1. A fastener clip for securing together a first material and a second material, at least the first material including a three dimensional and planar sheet exhibiting a bored interior defined by at least one inwardly facing side wall, said fastener clip comprising:

a flattened strap portion from which extends a first end configuration for fixedly engaging within the bored interior and against the inwardly facing side wall, said first end configuration further comprising a plurality of first, second, third and fourth outwardly and radially extending arms;

a gripping tab extending from each of said arms and engaging against the inwardly facing side wall, each of said gripping tabs further comprising a pair of first and second reverse angled teeth portion extending therefrom and which is adapted to engage against a selected location along the inwardly facing side wall of the bored interior; and a second and oppositely extending end configuration for engaging the second material.

2. The fastener clip as described in claim 1, said fastener clip having a specified shape and size and being constructed of a deflectable and spring steel material.

3. The fastener clip as described in claim 1, said fastener clip having a specified shape and size, the first sheet being constructed of a pair of spaced apart layers of a fiberglass matting which are separated by a honeycombed plasticized core.

4. The fastener clip as described in claim 1, said second end configuration further comprising a pair of upwardly extending and individual rail clip portions adapted to biasingly engage against oppositely facing sides of the second material and over an upper surface thereof.

5. The fastener clip as described in claim 4, each of said rail clip portions further comprising an arcuate shaped end.

6. The fastener clip as described in claim 1, said clip exhibiting a specified shape and size, the bored interior associated with the first material further exhibiting a substantially annular shape.

* * * * *